(12) United States Patent
Iwakuma et al.

(10) Patent No.: US 12,184,153 B2
(45) Date of Patent: Dec. 31, 2024

(54) SUPERCONDUCTING INDUCTION ROTATING MACHINE, AND SUPERCONDUCTING DRIVE FORCE GENERATING SYSTEM USING SAID SUPERCONDUCTING INDUCTION ROTATING MACHINE

(71) Applicants: KYUSHU UNIVERSITY, NATIONAL UNIVERSITY CORPORATION, Fukuoka (JP); NATIONAL INSTITUTE OF ADVANCED INDUSTRIAL SCIENCE AND TECHNOLOGY, Tokyo (JP)

(72) Inventors: Masataka Iwakuma, Fukuoka (JP); Teruo Izumi, Ibaraki (JP)

(73) Assignees: KYUSHU UNIVERSITY, NATIONAL UNIVERSITY CORPORATION, Fukuoka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 575 days.

(21) Appl. No.: 17/594,553

(22) PCT Filed: Apr. 24, 2020

(86) PCT No.: PCT/JP2020/017730
§ 371 (c)(1),
(2) Date: Oct. 21, 2021

(87) PCT Pub. No.: WO2020/218525
PCT Pub. Date: Oct. 29, 2020

(65) Prior Publication Data
US 2022/0216779 A1 Jul. 7, 2022

Related U.S. Application Data

(60) Provisional application No. 62/838,061, filed on Apr. 24, 2019.

(51) Int. Cl.
*H02K 55/00* (2006.01)
*B64D 27/24* (2006.01)
(Continued)

(52) U.S. Cl.
CPC ............. *H02K 55/00* (2013.01); *B64D 27/24* (2013.01); *H02K 1/16* (2013.01); *H02K 1/26* (2013.01); *H02K 3/02* (2013.01); *Y02E 40/60* (2013.01)

(58) Field of Classification Search
CPC . B64D 27/24; H02K 1/16; H02K 1/26; H02K 3/02; H02K 55/00; Y02E 40/60
(Continued)

(56) References Cited

U.S. PATENT DOCUMENTS 3,368,087 A * 2/1968 Madsen ................. H02K 55/02
310/40 R
3,743,867 A * 7/1973 Smith, Jr. ................ H02K 3/40
310/86
(Continued)

FOREIGN PATENT DOCUMENTS

GB 2548123 A 9/2017
JP 1996-505515 A 6/1996
(Continued)

OTHER PUBLICATIONS

Nakajima et al., English Machine Translation of JP1998257752 (Year: 1998).*

*Primary Examiner* — Rashad H Johnson
(74) *Attorney, Agent, or Firm* — Taro Yaguchi

(57) ABSTRACT

According to the present invention, there is provided a superconducting induction rotating machine 1 that has a
(Continued)

stator for which a plurality of superconducting armature coils are placed along the circumferential direction, and a rotor provided rotatably around a central axis line in a state opposing the stator with a predetermined gap interposed, wherein the rotor is configured of a complex consisting of a cylindrical electrically conductive material layer disposed on a side opposing the stator, and a magnetic material layer disposed on an opposite side to the side opposing the stator of the electrically conductive material layer, and wherein the superconducting induction rotating machine 1 rotationally drives the rotor by generating a rotational torque in the rotor with a rotating magnetic field created by the armature coils while the superconducting armature coils disposed on the stator being cooled to a superconducting state.

19 Claims, 13 Drawing Sheets

(51) Int. Cl.
  *H02K 1/16* (2006.01)
  *H02K 1/26* (2006.01)
  *H02K 3/02* (2006.01)
(58) Field of Classification Search
  USPC ........................................ 310/12.21
  See application file for complete search history.

(56) References Cited

U.S. PATENT DOCUMENTS

| | | | | |
|---|---|---|---|---|
| 3,781,578 | A * | 12/1973 | Smith, Jr. | H02K 3/00 |
| | | | | 310/216.002 |
| 3,999,091 | A * | 12/1976 | Kirtley, Jr. | H02K 55/04 |
| | | | | 310/40 R |
| 4,291,249 | A * | 9/1981 | Smith, Jr. | H02K 55/04 |
| | | | | 310/179 |
| 4,583,014 | A * | 4/1986 | Murphy, Sr. | H02K 55/04 |
| | | | | 310/40 R |
| 6,313,556 | B1 * | 11/2001 | Dombrovski | H02K 3/24 |
| | | | | 310/179 |
| 2003/0011253 | A1 * | 1/2003 | Kalsi | H02K 1/20 |
| | | | | 310/58 |
| 2003/0052554 | A1 * | 3/2003 | Mawardi | H02K 55/04 |
| | | | | 310/52 |
| 2007/0052304 | A1 | 3/2007 | Mason et al. | |
| 2011/0084566 | A1 | 4/2011 | Nakamura | |
| 2019/0145273 | A1 * | 5/2019 | Frank | F01D 15/10 |
| | | | | 244/53 R |
| 2019/0238020 | A1 * | 8/2019 | Frank | H02K 3/47 |
| 2020/0001960 | A1 * | 1/2020 | Oran | B63H 1/16 |
| 2020/0047908 | A1 * | 2/2020 | Filipenko | B64D 37/30 |
| 2020/0091810 | A1 * | 3/2020 | Miller | B64D 27/02 |
| 2022/0216779 | A1 * | 7/2022 | Iwakuma | H02K 55/00 |

FOREIGN PATENT DOCUMENTS

| | | | |
|---|---|---|---|
| JP | 10257752 | A * | 9/1998 |
| JP | 20085655 | A | 1/2008 |
| JP | 2013240147 | A | 11/2013 |
| JP | 2014217166 | A | 11/2014 |
| JP | 201561978 | A | 4/2015 |
| JP | 2018534473 | A | 11/2018 |
| WO | 93/16519 | A | 8/1993 |
| WO | 2009116219 | A | 7/2011 |

* cited by examiner

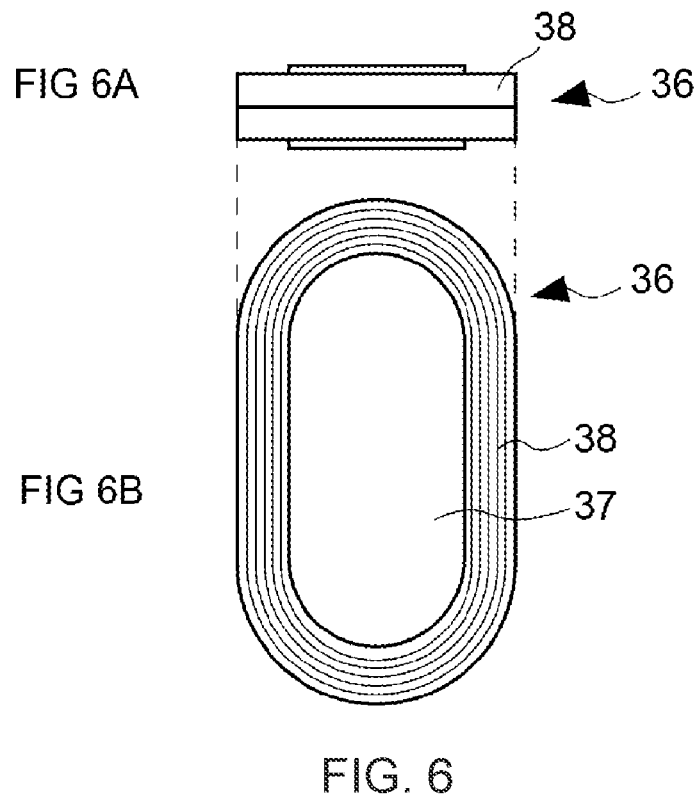
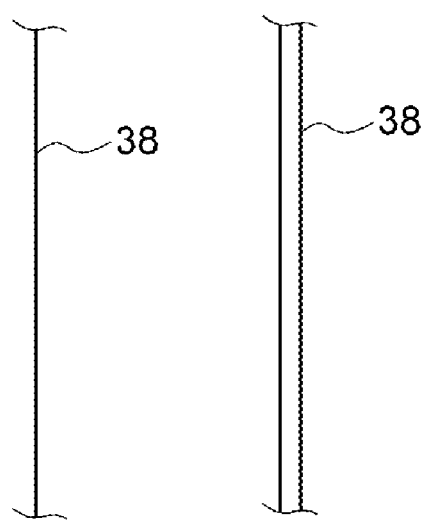
FIG. 6
FIG 7A  FIG 7B

SUPERCONDUCTING INDUCTION ROTATING MACHINE, AND SUPERCONDUCTING DRIVE FORCE GENERATING SYSTEM USING SAID SUPERCONDUCTING INDUCTION ROTATING MACHINE

FIELD OF THE INVENTION

The present invention relates to an induction rotating machine and a superconducting driving force generation system using the same.

BACKGROUND OF THE INVENTION

In recent years, in the process of development of newly emerging high-temperature oxide superconductors (yttrium-based (Y-based), bismuth-based (B-based) ones), which transition to a superconducting state in the vicinity of the liquid nitrogen temperature (77K), various research and development efforts using these superconductors have been put forth in the field of electric motors among others, aiming for size reduction, weight reduction and higher efficiency.

In superconductor applications in electric motors, ones using a superconducting rotor and a normal conducting stator, and ones using a superconducting rotor and a superconducting stator have been contemplated, but in AC electric motors, alternating currents need to be applied to armature coils, which lead to a problem of alternating current losses generated in the superconductor employed for the armature coils, and a problem of coil shapes becoming complex, hence, the current main stream is to develop electric motors applying a superconductor for a rotor, of which the following prior art documents are known as published research and development case examples.

PRIOR ART DOCUMENT

Patent Document

[Patent Document 1] Japanese Translation of PCT International Application Publication No. H8-505515
[Patent Document 2] Japanese Translation of PCT International Application Re-Publication No. 2009-116219
[Patent Document 3] Japanese Unexamined Patent Application Publication No. 2013-240147

Non-Patent Document

SUMMARY OF THE INVENTION

Problem to be Solved by the Invention

Of the above, an electric motor of Patent Document 1 has a rotor constructed with a laminated body of a high-temperature superconductor and a torque shield made of a normal conducting material, wherein upon activation at a room temperature, a rotating machine is activated in an induction mode by applying an alternating magnetic field (rotating magnetic field) generated by energizing armature coils (primary winding) arranged in a stator to thereby induce a torque generated by an interaction between an electric current induced in the torque shield and the alternating magnetic field, wherein once the rotor activates and reaches a predetermined rotation speed, the rotor is rotated synchronously by cooling the superconductor to its superconducting state at its critical temperature or lower, and causing the superconductor to use its magnetic flux to capture the alternating magnetic field.

This superconducting induction rotating machine may be operated without externally supplying the electric power to the rotor to enable simplification of this machine's structure.

However, upon the activation of rotating machine, transition from the induction mode to a synchronous operation requires determining the critical temperature of the superconductor and cooling the superconductor to the critical temperature or lower, which temperature control process takes a relatively long time, possibly reducing this electric motor's operational responsiveness. For this reason, in rotating machines used for applications where the machines are frequently and repeatedly activated and stopped as in electric vehicles, for example, significant joule heat (copper loss) is considered to occur in the torque shield, making it difficult to maintain the superconductor at or below the critical temperature, causing the decline of the rotating machine efficiency due to the increase of the copper loss itself.

Whereas, Patent Document 2 proposes an electric motor for addressing the inherent problem in Patent Document 1. A superconducting induction rotating machine of Patent Document 2 provides a structure which houses a combination of a rotor core of a squirrel-cage induction rotating machine, normal conducting squirrel-cage winding of rotor bars made of normal conducting wires with end rings connected with both ends of the rotor bars, respectively, and superconducting squirrel-cage winding of rotor bars made of superconducting conducting wires connected with end rings, wherein this combination is housed in slots formed in the circumferential surface of the rotor core.

In the normal conducting state, this electric motor may be activated and operated mainly by the torque generated by the interaction between the electric current induced in the normal conducting squirrel-cage winding and the rotating magnetic field generated by energizing the armature coils arranged in a stator, whereas, in the superconducting state, this electric motor may be operated independent of the superconductor critical temperature by the superconducting squirrel-cage winding which captures the magnetic flux of the rotating magnetic field applied by the armature coils of the stator to thereby achieve the synchronous operation.

However, even the electric motor of Patent Document 2 has the following challenges in its practical applications. That is, since the electric motor of Patent Document 2 is configured with the rotor core having the squirrel-cage rotor configured with both the normal conducting squirrel-cage winding and the superconducting squirrel-cage winding, when activating the rotating machine at a room temperature equal to or above the critical temperature of the superconducting squirrel-cage winding, large joule heat or copper loss occurs due to the induced electric current in the normal conducting squirrel-cage winding as in the torque shield of the superconducting rotating machine of Patent Document 1. Also, for the superconducting squirrel-cage winding, its winding structure becomes complex due to the required electric connections between both ends of the rotor bars and the end rings of the structure. Further, the electric connections between the rotor bars and the end rings are generally achieved by soldering, but their bonding strength is often problematic, leading to difficulties in ensuring high reliability in terms of centrifugal load bearing capacity and long-term use. Moreover, since the electric motor of Patent Document 2 employs a configuration to accommodate both the normal conducting squirrel-cage winding and the superconducting squirrel-cage winding in the slots in the heavy rotor core, it is difficult to reduce the weight and the size of this superconducting rotating machine.

Patent Document 3 discloses a novel superconducting rotating machine, which requires no supply of external electric power to a superconductor incorporated in a rotor, wherein the rotor is not provided with a torque shield of Patent Document 1, any normal conducting metal body as a joule heating source, such as normal conducting squirrel-cage winding of Patent Document 2, or a heavy rotor core, and wherein the superconducting rotating machine is configured to take advantage of superconducting characteristics of the superconductor with ingenuity such that the size and weight reduction of the superconducting rotating machine as well as its high-efficiency rotation performance may be achieved. In other words, the superconducting rotating machine of Patent Document 3 is equipped with an armature coil provided on the stator side, and a superconducting rotor having a plate-like superconductor, and the superconducting rotating machine is configured to cause the superconducting rotor to generate a rotating force based on an electromagnetic force produced by an interaction between a shielding current induced in the plate-like superconductor due to a magnetic field that the armature coil applies to the superconductor, and the magnetic field. However, while the superconducting rotor having the plate-like superconductor contributes to reducing the rotor size and weight, it was difficult to improve the torque for imparting the rotational force to the superconducting rotor.

Means for Solving the Problem

Considering the above challenges, the purpose of the present invention is to provide a superconducting induction rotating machine which is more compact, and capable of operating with less electric power and generating a driving force very efficiently.

Also, another object of the invention is to provide a superconducting induction rotating machine which has a simple structure, and is widely applicable as a propulsion generation system.

In other words, according to a principal aspect of the present invention, the following invention is provided.

(1) A superconducting induction rotating machine, comprising:
  a stator having a plurality of superconducting armature coils arranged along circumferential direction of the stator, and
  a rotor rotatably disposed around a central axis line, and opposing the stator across a predetermined gap,
  wherein the rotor is configured of a complex consisting of a cylindrical electrically conductive material layer disposed on a side opposing the stator, and a magnetic material layer disposed on a side opposite from the electrically conductive material layer's side opposing the stator, and
  wherein the superconducting induction rotating machine rotationally drives the rotor by generating a rotational torque in the rotor with a rotating magnetic field created by the armature coils while the superconducting armature coils disposed on the stator being cooled to a superconducting state.

(2) The superconducting induction rotating machine of (1), wherein
  a propulsion generation body for generating propulsion is secured on an inner circumferential surface or an outer circumferential surface of the rotor, and the rotor is rotationally driven to, in turn, drive the propulsion generation body to thereby generate propulsion.

(3) The superconducting induction rotating machine of (2), wherein
  the propulsion generation body are propeller blades secured on the inner circumferential surface or the outer circumferential surface of the rotor, which is on the side opposite from the side opposing the stator.

(4) The superconducting induction rotating machine of (2), wherein
  the propulsion generation body is a propeller blade secured on the inner circumferential surface, which is on the side opposite from the side opposing the stator, or the outer circumferential surface of the rotor.

(5) The superconducting induction rotating machine of (2), wherein
  the propulsion generation body is a tread body for transmitting a driving force from the rotating machine by friction with an object, and the tread body is secured on the inner circumferential surface or the outer circumferential surface of the rotor, which is on the side opposite from the side opposing the stator.

(6) The superconducting induction rotating machine of (1), wherein
  the stator comprises a stator main body retaining a plurality of superconducting armature coils, and
  the stator main body maintains its mechanical strength in low temperature, and is formed of an electrically non-conductive material.

(7) The superconducting induction rotating machine of (1), wherein
  the rotor is an outer rotor of the rotating machine, and
  the electrically conductive material layer is provided on the inner diameter side of the stator, and the magnetic material layer is provided on the outer diameter side of the stator.

(8) The superconducting induction rotating machine of (1), wherein
  the rotor is an inner rotor of the rotating machine, and
  the electrically conductive material layer is provided on the outer diameter side of the stator, and the magnetic material layer is provided on the inner diameter side of the stator.

(9) The superconducting induction rotating machine of (1), wherein
  the rotor is provided with radiation fins.

(10) The superconducting induction rotating machine of (1), wherein
  the rotor is defined by embedding strip-shaped superconducting wires in the electrically conductive material layer, and securing short-circuit rings on both ends of the rotor in a direction of its central axis line.

(11) The superconducting induction rotating machine of (10), wherein
  both ends of the superconducting wires are curved.

(12) The superconducting induction rotating machine of (10), wherein
  grooves are formed in the electrically conductive material layer for embedding the superconducting wires in.

(13) The superconducting induction rotating machine of (1), wherein
  the rotor is defined by arranging the superconducting wires on a surface of the electrically conductive material layer in a circumferential direction and a direction intersecting the circumferential direction, respectively, at predetermined intervals.

(14) The superconducting induction rotating machine of (1), wherein
liquid feed propeller blades are secured in the inner diameter section of the rotor, and a fluid flowing through the inner diameter section is pump-driven along an axis line of the rotor.

(15) A fluid drive system having the stator and the rotor of the superconducting rotating machine of (14), wherein the stator is attached in the mid-section of a fluid flow pipe with a circular cross section with the stator's central axis positioned concentrically with the fluid flow pipe, and the stator is disposed so that it is exposed inside the fluid flow pipe to thereby pump-drive a fluid flowing through the fluid flow pipe.

(16) The fluid drive system of (15), wherein
the pump-driven fluid is a refrigerant, and
the superconducting armature coils are cooled with the refrigerant.

(17) The fluid drive system of (16), wherein
the superconducting induction rotating machines are provided at predetermined intervals along the fluid flow pipe.

(18) A superconducting driving force generation system, comprising the superconducting induction rotating machine of (1), a superconducting electric generator for supplying electricity to the rotating machine, and a superconducting cable for connecting the electric generator and the rotating machine.

(19) The superconducting driving force generation system of (18), further comprising:
a common freezing system for cooling the superconducting induction rotating machine, the superconducting electric generator and the superconducting cable.

(20) The superconducting driving force generation system of (18), further comprising:
a gas turbine engine for driving the superconducting electric generator,
wherein the gas turbine engine uses a LNG having a refrigerant function or a gas made of a liquid hydrogen treated by a freezing system.

(21) An aircraft to which the superconducting driving force generation system of (12) is applied, wherein
the superconducting induction rotating machine is installed in parallel on an upper surface of main wings of the aircraft.

Effect of the Invention

According to a configuration of the present invention, rotor may be configured with a thin and light-weight cylindrical body, and a superconducting induction rotating machine with high efficiency and high output may be provided.

Also, according to the present invention, a rotor may be configured with a simple cylindrical body having no windings and the like, and the entire structure may have reduced size and weight to provide a rotating machine which is inexpensive as well as highly durable and reliable.

Further, propulsion generation body or bodies such as fins, propellers, tires or the like may be directly attached, for example, on an inner surface or an outer surface of the cylindrical body to thereby provide a propulsion generation system with a simple structure and a reduced driving force transmission loss.

Note that features and marked effects of the present invention other than those described above will become apparent to those skilled in the art upon referring to the following embodiment.

BRIEF DESCRIPTION OF THE DRAWINGS

FIG. 6 are a top view and a front view, respectively, showing a superconducting armature coil according to the embodiment;

FIG. 7A, B are a side view and a front view, respectively, showing a part of a superconducting coiling wire according to the embodiment;

DETAILED DESCRIPTION OF THE INVENTION

A best mode of the present invention will be described below with reference to accompanying drawings.
(Fully Superconducting Propulsion Generation System)

Figure 1:
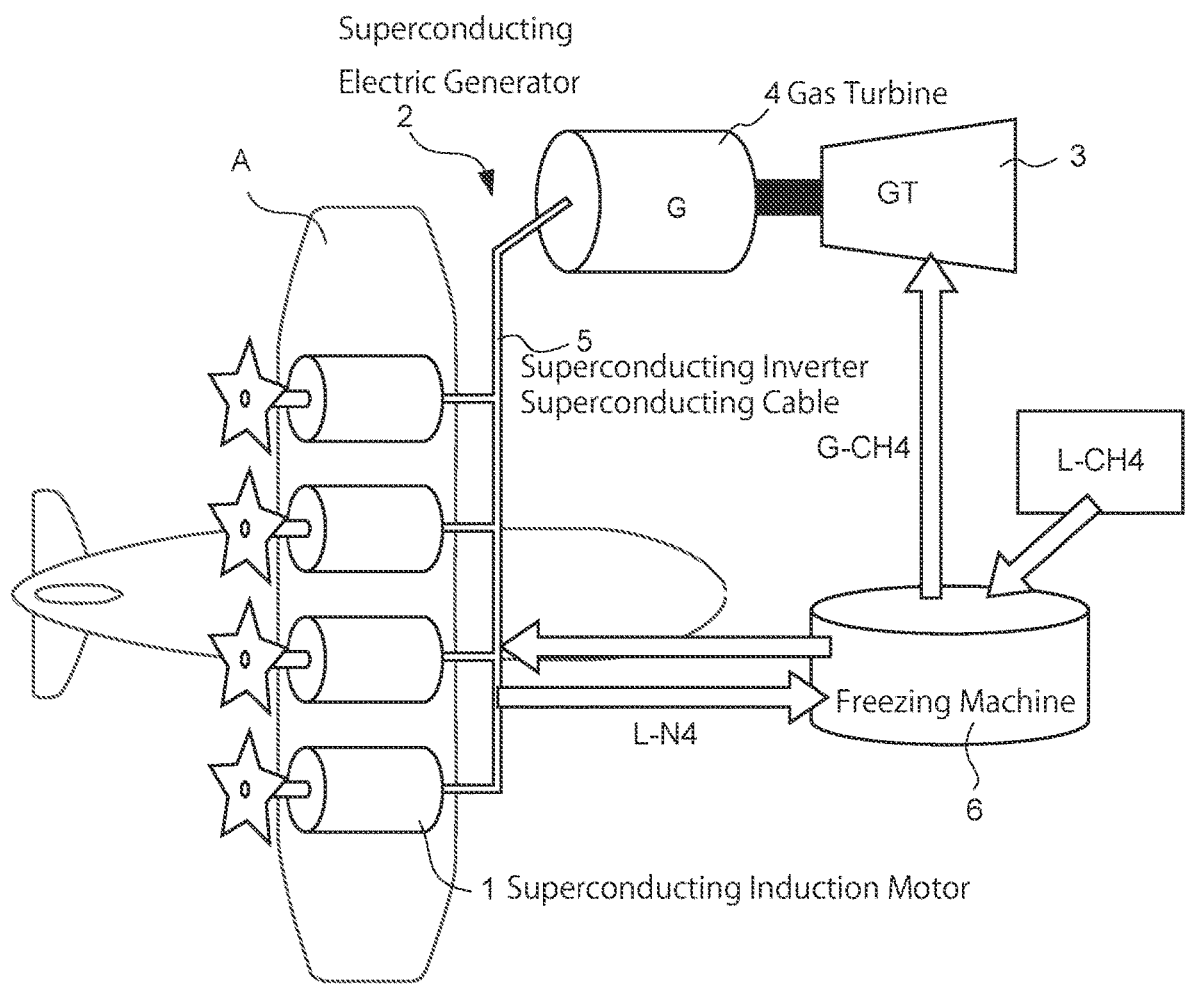
FIG. 1 is a schematic view of a superconducting driving force generation system according to an embodiment of the present invention.

FIG. 1 is a schematic view showing a structural concept of a fully superconducting system 2, which includes a superconducting induction motor 1 according to the present embodiment.

This system 2 has a basically high-efficient gas turbine engine 3, a superconducting electric generator 4, a superconducting inverter/superconducting cable 5 and the superconducting induction motor 1. This system 2 uses LNG or liquid hydrogen, having a refrigerant function, as a fuel for the gas turbine engine 3, and liquid nitrogen as a refrigerant for cooling a superconductor. Also, the system 2 is configured to be capable of suppressing overall electric power consumption by processing the above fuel and refrigerant with a common freezing machine 6.

In addition, this fully superconducting system 2 connects the electric generator 4, the superconducting inverter/cable 5 and the superconducting induction motor 1 without exposing them to a room temperature to thereby integrate a common refrigerant flow channel for cooling them. Thus, the system 2 is configured so that it may further decrease a refrigerant load to allow reduction of the electric power consumption.

It is contemplated that this fully superconducting system 2 is implemented in an aircraft (indicated with "A" in the figure), for example.

Currently, aircrafts have one to two jet engines mounted on each of their wings, but when the superconducting propulsion system is used, for example, four superconducting induction motors are disposed such that they are distributed at regular intervals in a lengthwise direction of the wings on top of the aircraft, as shown in FIG. 1.

Current jet engines have output of 5 kW/kg, this fully superconducting system may theoretically achieve 20 kW/kg output. Thus, if this system is mounted on an aircraft, it may take off using less than half of the power current aircrafts use.

Note that, when the system is applied to an aircraft, the number of motors and their respective outputs may be selected as needed. Also, when applied to an aircraft, the system may be configured such that each motor may be independently controlled for steering in up, down, left and right directions.

(Outer Rotor-Type Superconducting Induction Motor)

Figure 2:
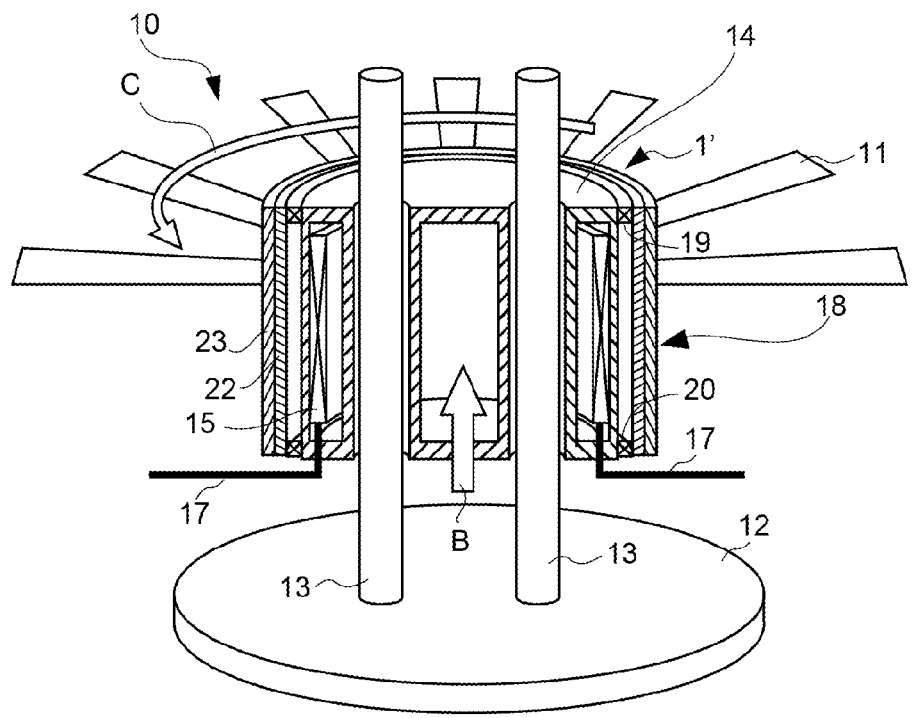
FIG. 2 is a schematic structural view showing an outer rotor-type superconducting induction motor according to the embodiment.

FIG. 2 shows a conceptual diagram of a demonstration system 10 of an outer rotor-type motor 1' as a superconducting induction motor 1 used for the fully superconducting system 2. This demonstration system 10 is configured to validate if enough output may be obtained from the superconducting induction motor 1', and if enough output is obtained, the demonstration system 10 is configured so that it may be driven upward (indicated with an arrow B) by propeller blades 11 attached to the rotor to thereby levitate.

A structure of the demonstration system 10 of this outer rotor-type superconducting induction motor 1' will be described below.

Indicated with 12 in FIG. 2 is a base. This base 12 is formed in a disc shape, and provided on its central top side are a pair of pole-shaped linear guides 13 standing in parallel and spaced apart by a certain distance. These linear guides 13 act as vertical guides for the induction motor 1' when the outer rotor-type induction motor 1' is driven upward (arrow B) by propulsion of the propeller blades 11.

A stator 14 is retained on the linear guides 13 slidably in an up-down direction. This stator 14 is formed of a cylindrical member with its top and bottom openings being closed, and a superconducting armature coil 15 is disposed on the inner surface of an outer circumferential wall section of the stator 14. This stator 14 has a structure of a vacuum container having a predetermined degree of vacuum (e.g., from about 10-5 to about 10-6 Torr) in order to maintain a cooling temperature of the superconducting armature coil 15. The superconducting armature coil 15 is connected to a power supply lead 17 for supplying electric power from the electric generator 4 (FIG. 1), and the power supply lead 17 is guided out of the stator 14 from its bottom.

Also, a rotor 18 having a cylindrical main body is externally fitted over the stator 14 with a gap of a predetermined dimension between the rotor 18 and the stator 14. Between the rotor 18 and the stator 14 at the top and bottom ends thereof, bearings indicated with 19, 20 are inserted.

This rotor 18 is constituted with a complex with small thickness consisting of a highly electrically conductive material layer 22 consisting of a highly conductive non-magnetic material, such as copper, aluminum or the like, disposed on a surface opposing the stator 14; and a magnetic material layer 23 consisting of highly magnetically permeable iron or the like for returning magnetic flux, which magnetic material layer 23 disposed of immediately outside of the highly electrically conductive material layer 22, wherein the rotor 18 has an extremely light weight construction. In other words, magnetic flux intersecting the highly electrically conductive material layer 22 is increased by the magnetic material layer 23, facilitating an increase of induced current in the highly electrically conductive material layer, and therefore, an increase of torque.

However, it should be noted that if the magnetic material layer 23 is thickened, it will increase the system's weight.

Also, the propeller blades 11 are provided on the outer circumferential surface of this rotor 18. A base section 11a of each of the propeller blades 11 is secured by welding, and distal ends 11b of the propeller blades 11 extending outward along diametrical directions of the rotor 18 are provided around periphery of this rotor 18 at regular intervals.

In such a configuration, if the superconducting armature coil 15 provided on the stator 14 is energized, the rotor 18 may be rotationally driven by a rotational torque in the rotor 18 generated by a rotating magnetic field created by the armature coils 15. This in turn rotate the propeller blades 11 in a direction indicated with an arrow C to thereby allow the induction motor 1' to levitate.

Note that although it is concerned that the temperature of the rotor 18 rises in the above configuration, this problem may be addressed by the propeller blades 11 functioning as radiation fins as well.

The present inventors confirmed that an effective output efficiency is obtained through demonstration experiments such as ones related to the above problem, and continued other experiments to complete the present invention.

(Inner Rotor-Type Superconducting Induction Motor)

Figure 3:
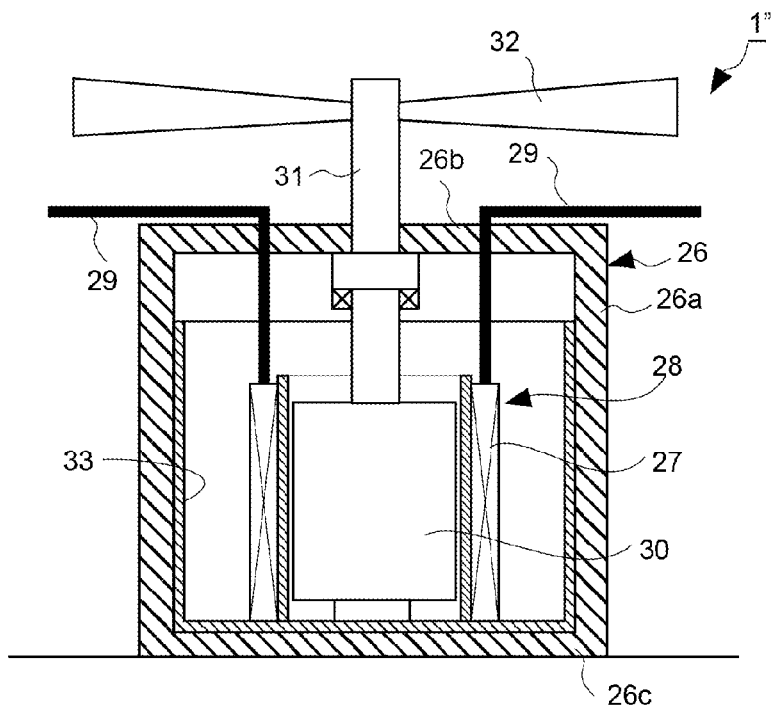
FIG. 3 is a schematic structural view showing an inner rotor-type superconducting induction motor according to the embodiment.

FIG. 3 is a schematic view showing an inner rotor-type superconducting induction motor 1".

This induction motor 1" comprises a stator frame 26; a stator 28 secured to the stator frame 26 for maintaining superconducting armature coils 27 thereon; a power supply lead 29 connected to the top of the armature coils 27 for feeding them electricity; a rotor 30 rotationally retained about an vertical axis and facing the inner surface of the coils 27; a central axis 31 extending upward from the rotor 30 to above the stator 28 and rotationally retained in the center of top wall of the stator frame 26; and propeller blades 32 provided at the top end of the central axis 31.

The stator frame 26 is formed of any material, preferably a material with a thermally-insulating function. This stator frame 16 comprises a cylindrical (or rectangular) outer circumferential wall 26a as well as a top wall section 26b and a bottom wall section 26c for closing an upper opening and a lower opening of the outer circumferential wall 26a. Inside this stator frame 26, a container 33 is secured for retaining liquid nitrogen. This stator frame 26 is adapted to have a structure of vacuum space of a predetermined degree of vacuum (e.g., from about 10-5 to about 10-6 Torr) in order to maintain a cooling temperature of the superconductor filling the armature coil 33.

Here, the container 33 is formed of a material which is an electric insulator generating no eddy current loss and having mechanical strength at a low temperature, such as a FRP. However, this material is not limited to FRPs and may be of other materials having similar characteristics.

Figure 4:
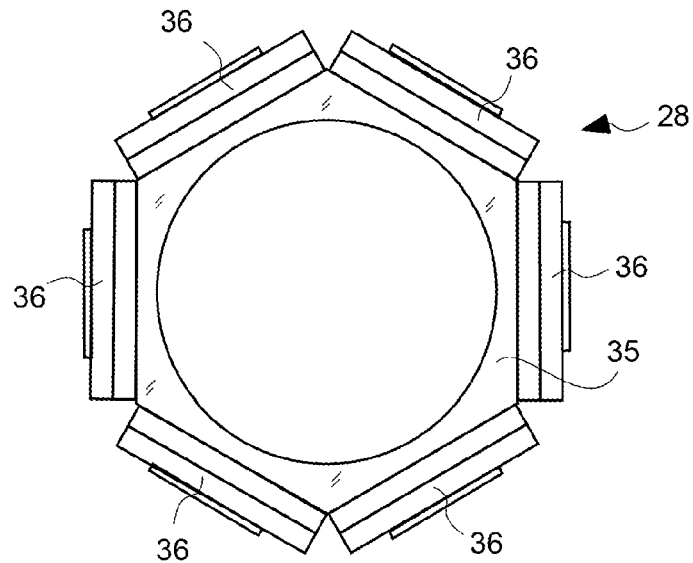
FIG. 4 is a top view showing a stator according to the embodiment.
Figure 5:
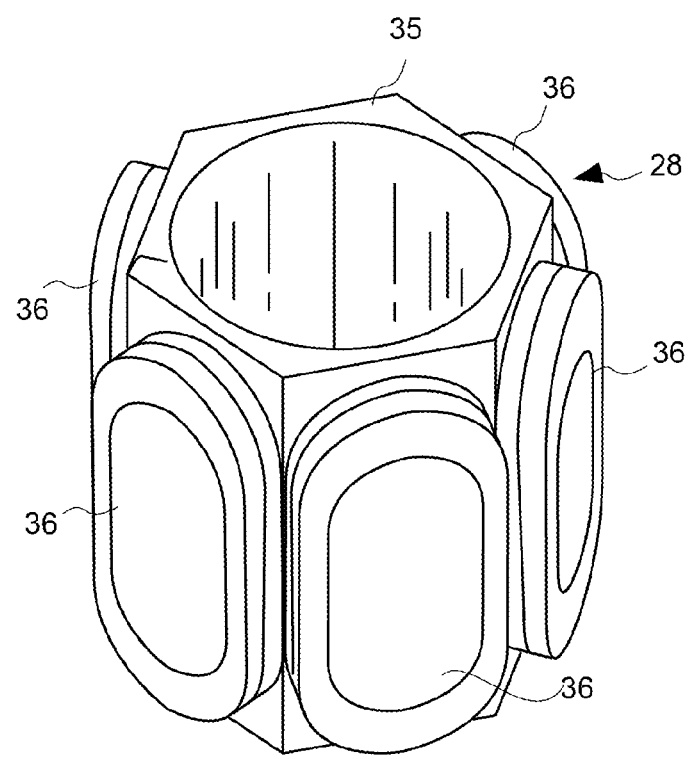
FIG. 5 is a perspective view showing the stator according to the embodiment.

FIG. 4 shows a top view of the stator 28 secured to the container 33 in the stator frame 26; and FIG. 5 shows a perspective view of the stator 28.

The stator 28 comprises a cylindrical main body 35 and superconducting armature coils 36 attached to the main body 35.

The main body 35 is formed of a FRP and, as shown in FIG. 4, its cross section has a shape having a hexagonal profile and having a central cylindrical through-hole. Thus, as shown in FIG. 5, an inner circumferential surface of this main body 35 is formed in a tubular shape having a certain diameter, and an outer circumferential surface of this main body 35 is formed to be divided into six rectangular sides in its circumferential direction.

Also, one superconducting armature coil 36 is secured to each of the six rectangular sides, and therefore, six superconducting armature coils 36 in total are secured along the outer circumference of the main body 35.

FIG. 6 shows a top view (FIG. 6A) and a plan view (FIG. 6B) of one of the superconducting armature coils 36. Each of the superconducting armature coils 36 of this embodiment example does not use a core made of a material with high magnetic permeability such as iron, but is constructed only with a FRP core 37 and a superconducting coiling wire 38 wound around the FRP core 37, thus enabling this structure to increase its magnetic flux density. The superconducting coiling wire 38 is, as shown in FIG. 7 (FIG. 7A, FIG. 7B), a thin and narrow ribbon-like RE-based (yttrium-based) high-temperature superconducting wire. However, the superconducting wire is not limited to the above shape and material, and other superconducting wires, such as bismuth-based superconducting materials may be used.

The stator 28 with the superconducting armature coils 36 attached thereto is secured in the central section of the container 33, as shown in FIG. 3. The container 33 is filled with a refrigerant, and the superconducting armature coils 36 are cooled using refrigerant immersion cooling.

Note that the armature coils 36 may be connected in series or in parallel.

Figure 8:
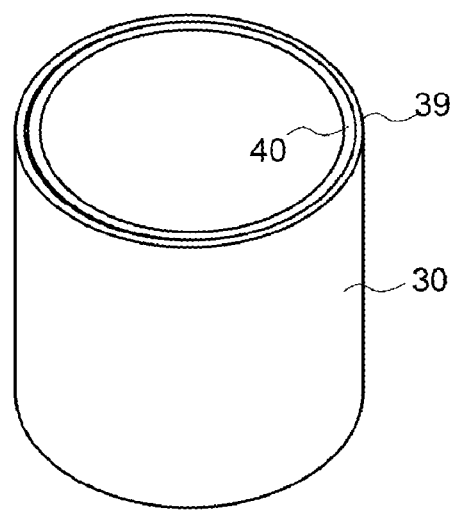
FIG. 8 is a perspective view showing a rotor according to the embodiment.

Also, the rotor 30 disposed inside the inner diameter of the stator 28 is a cylindrical member, as shown in FIG. 8, and has an outer diameter smaller than the inner diameter of the stator 28 (main body 35). As in the example of FIG. 1, this rotor 30 is constituted with a complex consisting of an electrically conductive material layer 39 of aluminum, copper or the like, disposed on a surface opposing the stator 14; and a magnetic material layer 40 with high magnetic permeability for returning magnetic flux, which magnetic material layer 40 laminated on an inner surface of the electrically conductive material layer 39, wherein the rotor 30 has an extremely light weight construction.

Figure 9:
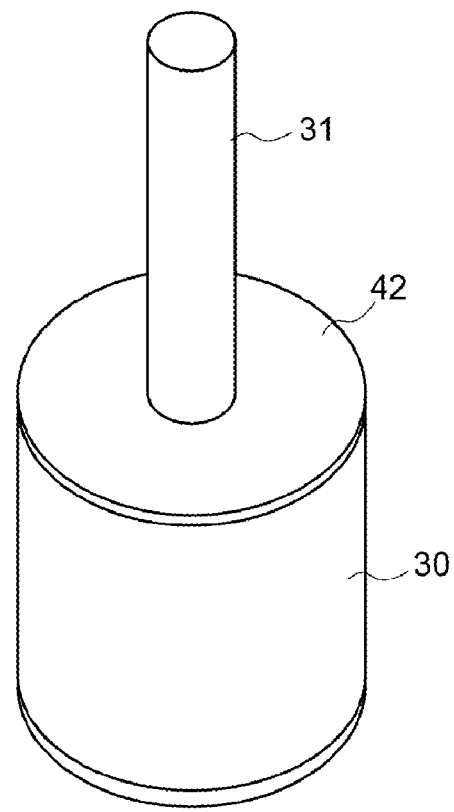
FIG. 9 is a perspective view showing the rotor according to the embodiment.

Also, as shown in FIG. 9, lid bodies 42, 43 are attached at the top and bottom of the rotor 30, respectively, and the central axis 31 is inserted vertically through these lid bodies 42, 43 and the rotor 30 along the central axis of the rotor 30.

Figure 10:
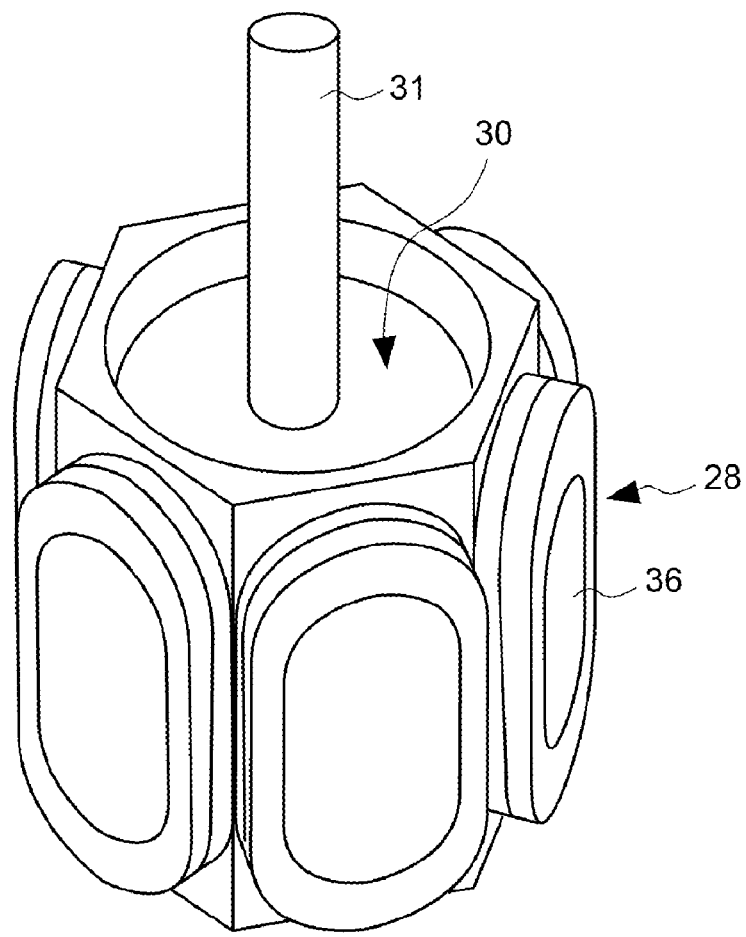
FIG. 10 is a perspective view showing the stator and the rotor combined according to the embodiment.

FIG. 10 is a schematic view showing an inner rotor-type induction motor unit assembled by inserting the rotor 30 into the stator 28.

(Other Stator Embodiments)

The above stator 28 of the inner rotor-type induction motor 1" was an example where six armature coils were attached on the outer surface of the main body 35, but the present invention is not limited by this configuration.

Figure 11A:
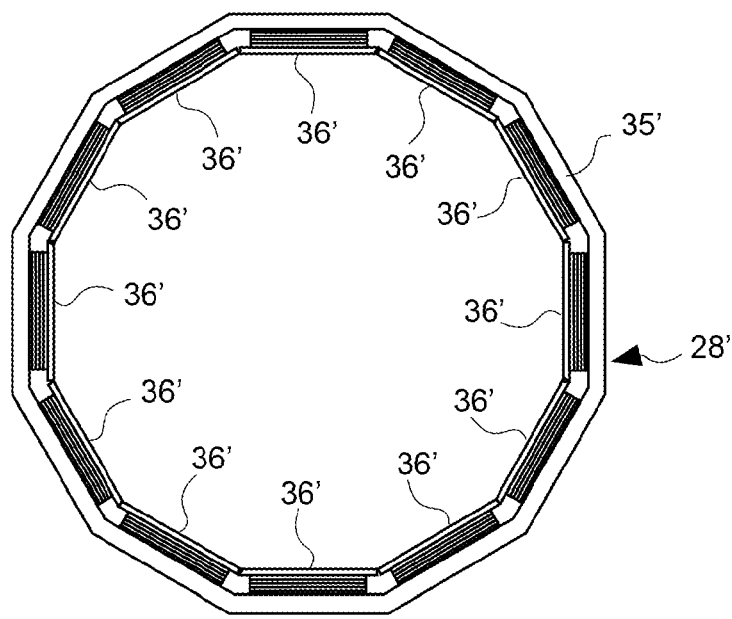
FIG. 11A, 11B are a top view and a perspective view, respectively, showing a stator according to another embodiment.
Figure 11B:
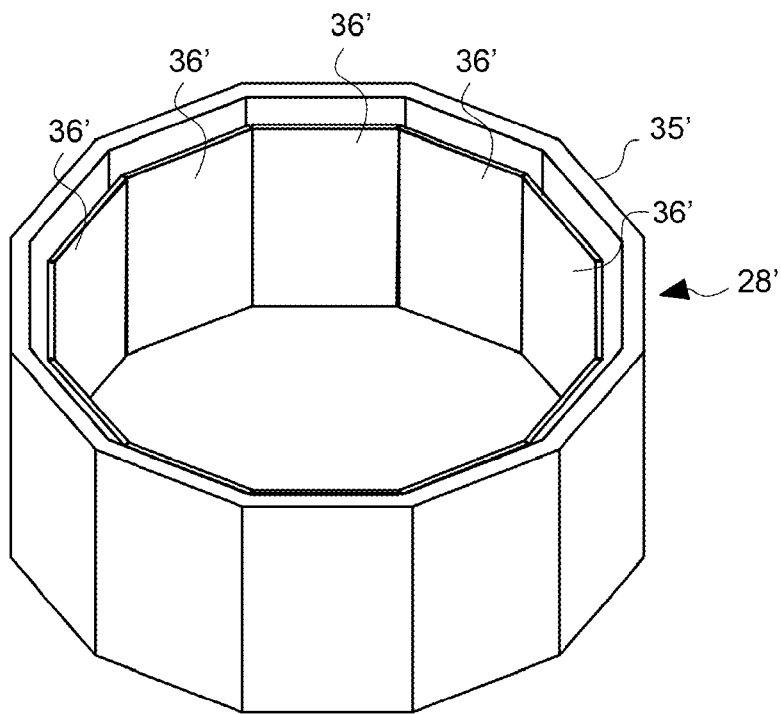

In an example shown in FIG. 11A, FIG. 11B of FIG. 11, a main body 35' is larger than the main body 35, and 12 armature coils 36' are secured on an inner surface side of the main body 35'. According to such a configuration, larger output may be obtained.

(Other Rotor Embodiments)

The above-described embodiment was an example where the stator 28 side was made to be superconductive while the rotor 30 was not and configured as a light cylindrical body, but if a rotor indicated with 30' below is used as in FIG. 12, the rotor 30 may be made superconductive while keeping the operation effect of the present invention to enable higher efficiency and output of the induction motor.

The rotor 30' comprises superconducting wires 45 embedded vertically in an electrically conductive material layer 39' (a layer formed of copper) on an outer side of the rotor 30', and short-circuit rings 46, 47 attached at the top and bottom, respectively, to connect the superconducting wires 45. The embedding of the superconducting wires 45 into the rotor 30' may improve the shielding current density (increase shielding current) induced by the magnetic flux linking to the rotor 30', and even when a rotor 30' has a small thickness, it may induce a large current. Accordingly, the torque increases to thereby enable an improved output density of the superconducting induction motor.

Also, in this embodiment, the superconducting wires 45 are respectively fitted in grooves 39a provided in an electrically conductive material layer 39' made of copper, and the grooves are curved in one direction at their tops and bottoms. Thus, the shielding current may be configured to flow in loops, and characteristic degradation (decline of a critical current value) of the superconducting wires may be prevented.

Figure 12:
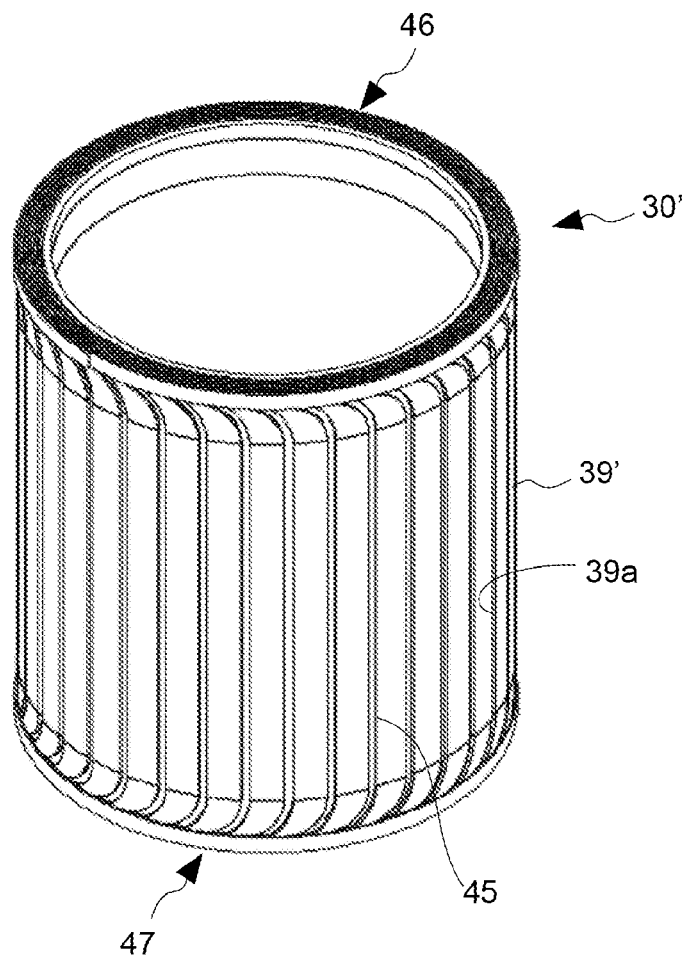
FIG. 12 is a perspective view showing a rotor according to yet another embodiment.
Figure 13:
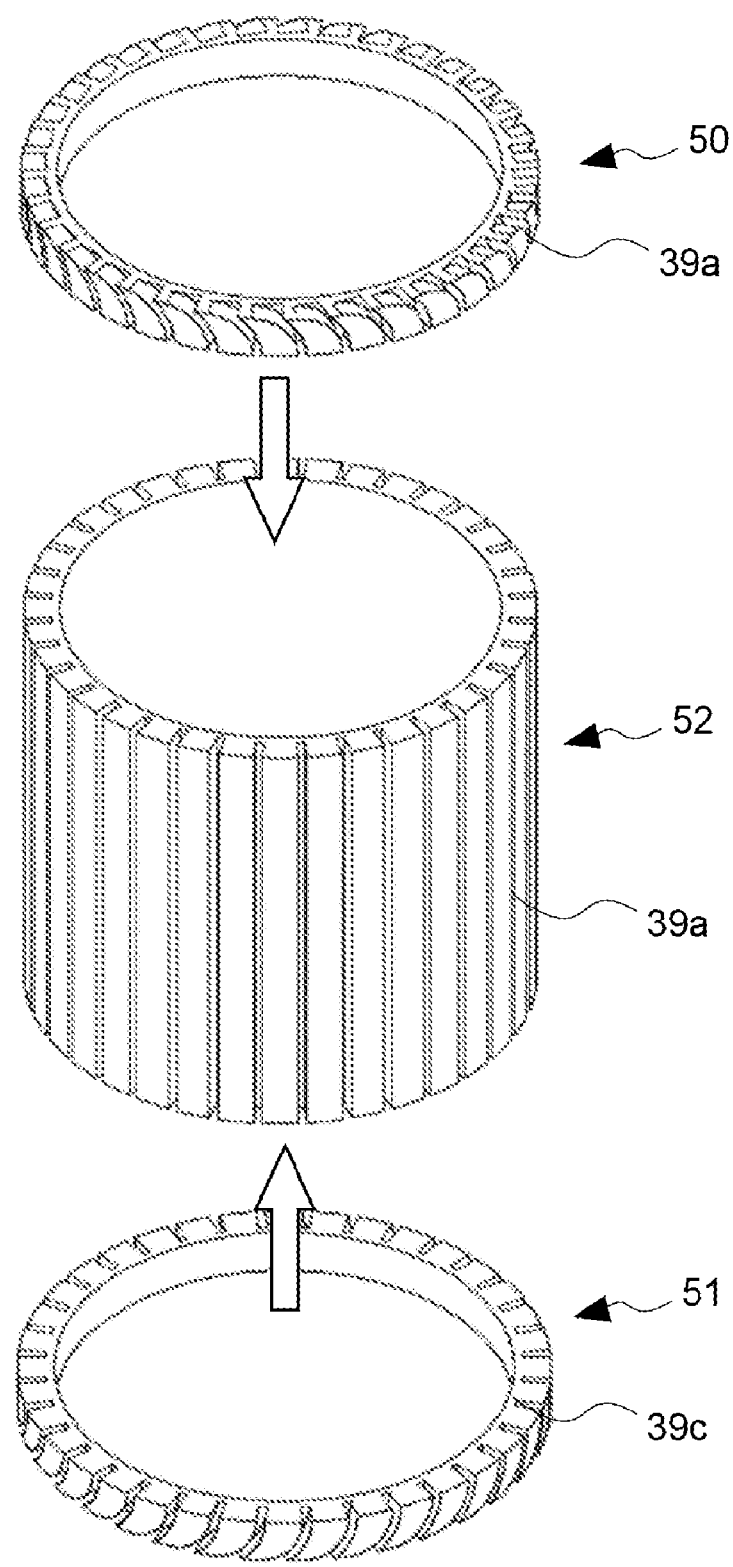
FIG. 13 is a perspective view showing assembly of the rotor of FIG. 12.
Figure 14:
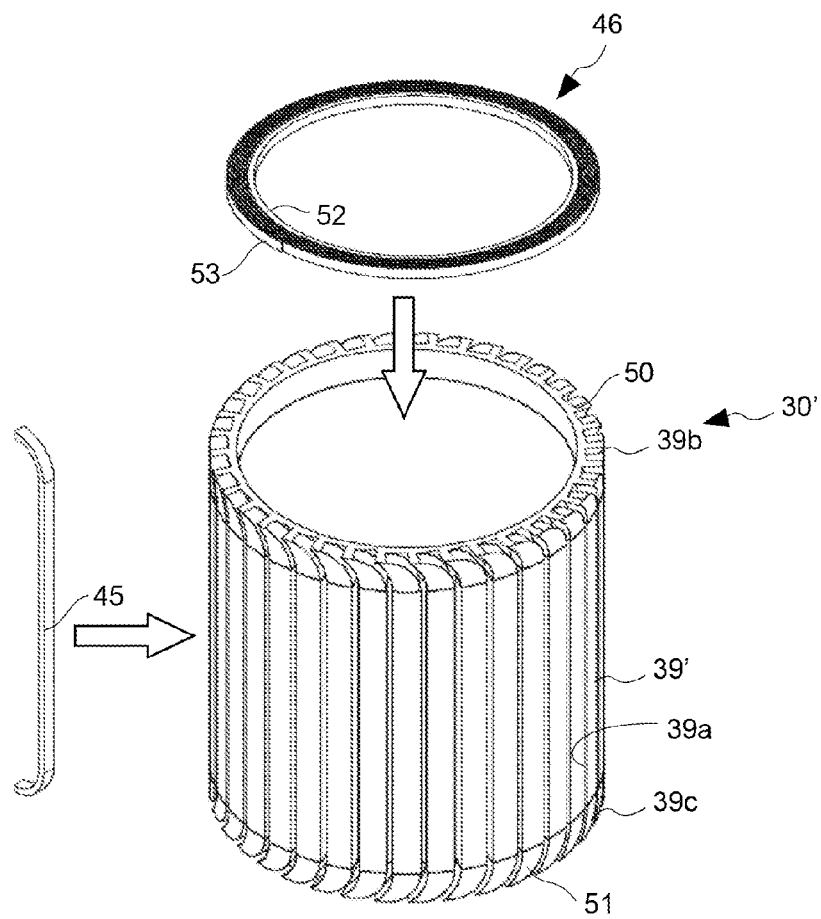
FIG. 14 is a perspective view showing assembly of the rotor of FIG. 12.

FIG. 12 and FIG. 13 are diagrams respectively illustrating a structure of and steps for assembling the electrically conductive material layer 39' having the grooves 39a.

In this embodiment, the rotor (electrically conductive material layer 39') is by separately shaping and assembling ring-shaped parts 50, 51 having curved grooves 39b, 39c, and a part 52 structuring a midsection. Note that the depth direction of the grooves 39a-39c is adapted to provide a slightly angled or skewed relative to the radial direction. They are configured to be capable of suppressing harmonic wave torques, electromagnetic excitation force.

Also, as shown in FIG. 13, the rotor 30' is completed by fitting the ribbon-shaped superconducting wires 45 into the grooves 39a-39c, with each of the upper and lower ends of the superconducting wires 45 curved to fit the shape of the grooves 39a-39c, and then, attaching the short-circuit rings 46, 47 onto the upper and lower ends.

Note that each of the short-circuit rings 46, 47 is configured in a ring shape by winding a ribbon-shaped superconducting wire 53 in a horizontal direction along a circumference of each copper ring 52 having the same thickness as a width of the wire 45 so that the short-circuit rings 46, 47 respectively have the same width as the thickness of the main body.

Figure 15:
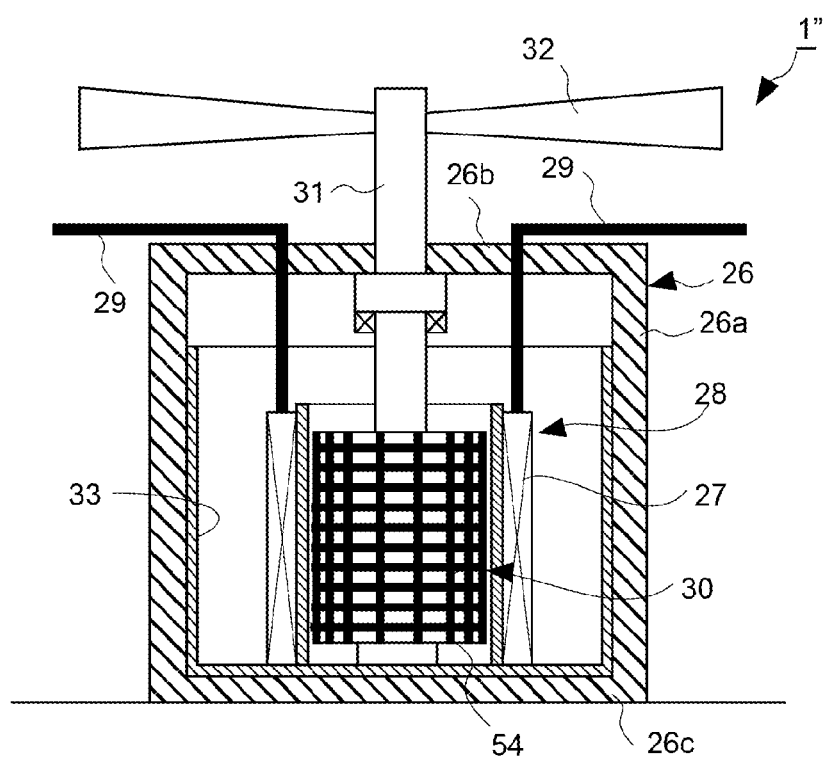
FIG. 15 is a schematic view showing a rotor according to another embodiment of the present invention.

Also, note that the superconducting wire does not need to be embedded into the rotor, but may be affixed to the surface of the rotor. In this case, as indicated with the numeral 54 in FIG. 15, it is preferred that the superconducting wires are arranged in a mesh-like manner with some of the superconducting wires provided in a circumferential direction intersecting with the others provided in a direction parallel to a central axis line, and that the superconducting wires are provided at predetermined intervals to thereby cover the entire surface of the electrically conductive material layer of the rotor.

(Other Application Examples of Superconducting Induction Rotating Machine)

Figure 16A:
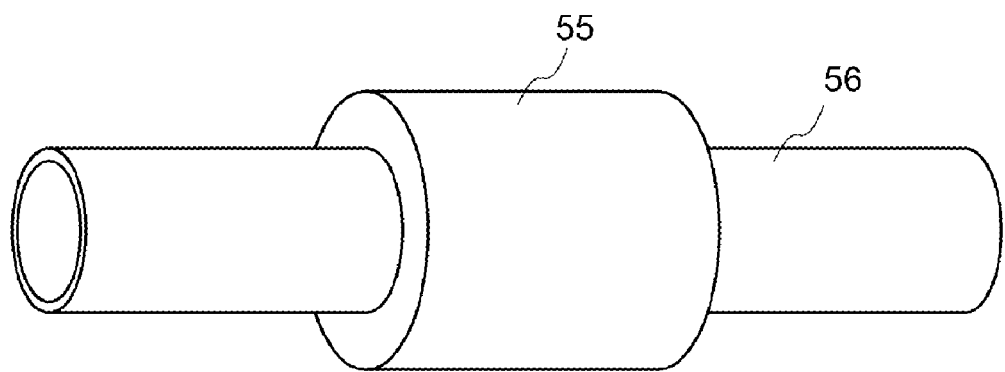
FIG. 16A, B are schematic views showing a liquid feed system according to another embodiment of the present invention.
Figure 16B:
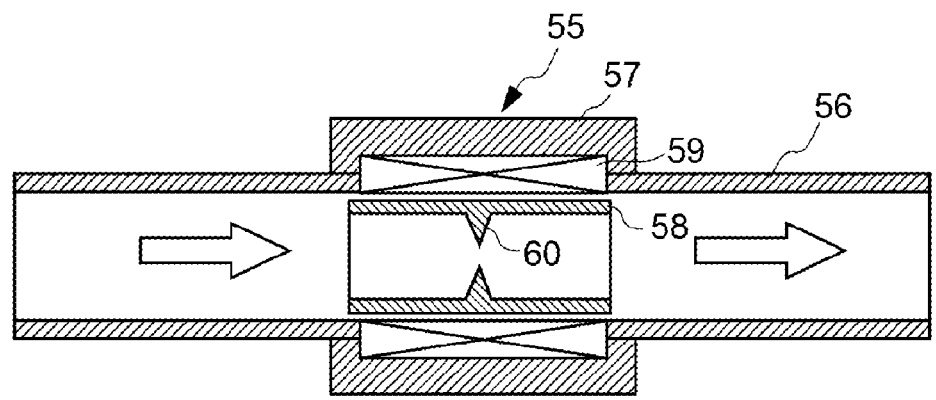

FIG. 16 shows an example of a superconducting induction rotating machine of the present invention applied to a liquid feed pump for liquid nitrogen or liquid hydrogen.

In other words, as shown in FIG. 16A, B, the liquid feed pump 55 of this embodiment is disposed in the midsection of a liquid feed pipe 56.

In this example, a stator 57 of an induction rotating machine as the liquid feed pump 55 is secured to the liquid feed pipe 56, and a cylindrical rotor 58 is disposed in the liquid feed pipe, and is retained by the rotor 57 through bearings, which is not shown, while opposing superconducting armature coils 59.

The rotor 58 is formed as a complex in a similar manner to that of the aforementioned embodiments, but is configured in such a way that a liquid flows through the liquid feed pipe inside an inner diameter section of the rotor 58. Also, propeller fins 60 are secured in the inner diameter section of this rotor 58.

This example is configured so that liquid nitrogen flowing inside the liquid feed pipe 56 is used to cool the superconducting armature coil 59. Thus, the structure of the stator of the induction motor may be simplified.

Also, when the liquid feed pipe 56 is long, a plurality of the liquid feed pumps 55 are disposed at predetermined intervals. In this case, since the refrigerant flowing through the liquid feed pipe is used to cool the superconducting armature coil 59, there is no need to provide additional means for cooling.

Therefore, it is effective to use this liquid feed pump for a refrigerant supply system of the fully superconducting system shown in FIG. 1.

Figure 17:
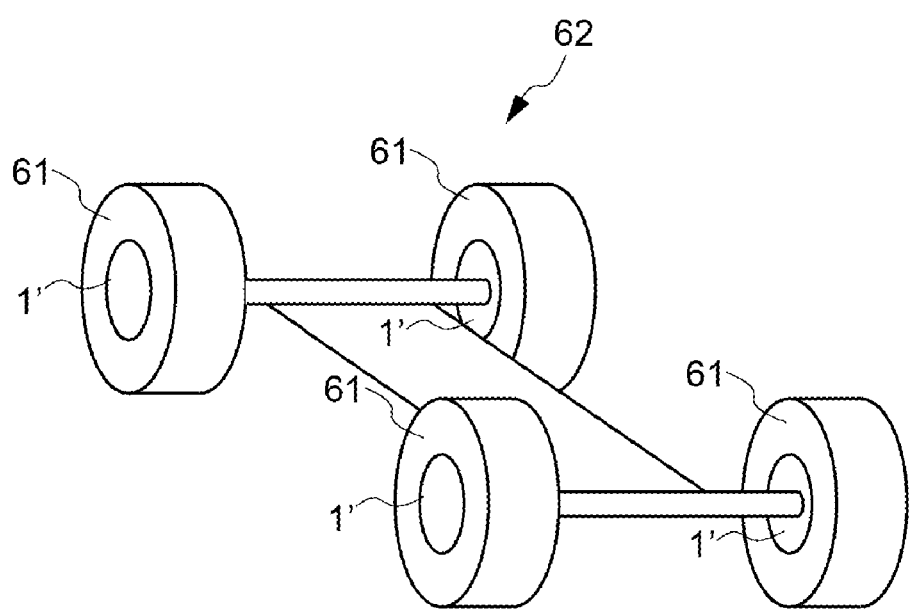
FIG. 17 is a schematic view showing a tire system according to still another embodiment of the present invention.

FIG. 17 shows an example incorporating the superconducting induction motor of the present invention into a compact passenger vehicle.

A configuration of this case uses outer rotor-type superconducting induction motors 1' similar to the one shown in FIG. 2, and tires (tread bodies) 61 are directly attached to outer circumferential surfaces of a rotor 18, as shown in FIG. 17. Thus, self-propelling tires 61 may be configured.

Also, according to a passenger vehicle 62 with a plurality of the tires 61 attached thereto, compact mobility with a very simple configuration may be provided.

According to such a structure, when the rotors are rotationally driven, an induction rotating machine of this embodiment may drive and feed liquid through liquid feed pipes.

Although various embodiments of the present invention have been described, it should be understood that the present invention is not be limited to the above-described embodiments, and various changes and modifications may be made without departing from the scope and spirit of the invention.

For example, although the system shown in FIG. 1 was applied to an aircraft in the above one embodiment, it is not limited to these examples and may be applied to any objects requiring propulsion. For example, the system may be applied to a passenger vehicle (FIG. 17) or a train.

Also, while one of the above embodiments used propeller blades/fins for generating propulsion, any means for generating propulsion by rotation of a rotor may be used. Further, when these blades or fins are used as means for dissipating heat, any configurations for increasing surface areas may be used, such as a honeycomb structure.

Also, when transmitting a driving force of the superconducting induction motor of the present invention by contacting with an object such as the ground, the present invention is no limited to using tires, as shown in FIG. 17, and caterpillars or gears may be attached as propulsion generation bodies.

DESCRIPTION OF THE REFERENCE NUMBERS

1. Superconducting induction motor
2. Fully superconducting system
3. Gas turbine engine
4. Superconducting electric generator
5. Superconducting inverter/Superconducting cable
6. Freezing machine
10. Demonstration system
11. Propeller blades
11a. Base section
11b. Distal end
12. Base
13. Linear guide
14. Stator
15. Superconducting armature coil
16. Stator frame
17. Power supply lead
18. Rotor
22. Highly electrically conductive material layer
23. Magnetic material layer
25. Armature coil
26. Stator frame
26a. Outer circumferential wall
26b. Top wall section
26c. Bottom wall section
27. Superconducting armature coils
28. Stator
29. Power supply lead
30. Rotor
31. Central axis
32. Propeller blades
33. Container
35. Main body
36. Superconducting armature coils
37. Core
38. Superconducting coiling wire
39. Electrically conductive material layer
40. Magnetic material layer
42, 43. Lid bodies
45. Superconducting wire
46, 47. Short-circuit rings
52. Copper ring
53. Superconducting wire
54. Superconducting wire
55. Liquid feed pump
56. Liquid feed pipe
57. Stator
58. Rotor
59. Superconducting armature coils
60. Propeller fins
61. Tires
62. Passenger vehicle (compact mobility)

The invention claimed is:

1. A superconducting induction rotating machine, comprising:
   a stator having a plurality of superconducting armature coils arranged along circumferential direction of the stator, and a rotor rotatably disposed around a central axis line, and opposing the stator across a predetermined gap, wherein the stator comprises a stator main body retaining a plurality of superconducting armature coils, the stator body is made of an electrically non-conductive material that maintains mechanical strength at low temperatures, and the superconductor armature coils do not have cores having a high magnetic permeability material;

wherein the rotor is configured as a cylindrical member having a thin peripheral wall defining a cylindrical space inside, wherein the peripheral wall is configured as a complex comprising an electrically conductive material layer that is disposed on a side opposing the stator and faces the stator with a predetermined gap therebetween, and a magnetic material layer disposed on a surface opposite to the side of the electrically conductive material layer that faces the stator, and wherein the superconducting induction rotating machine rotationally drives the rotor by generating a rotational torque in the rotor with a rotating magnetic field created by the armature coils while the superconducting armature coils disposed on the stator being cooled to a superconducting state.

2. The superconducting induction rotating machine of claim 1, wherein a propeller blade for generating propulsion is secured on an inner circumferential surface or an outer circumferential surface of the rotor, and the rotor is rotationally driven to, in turn, drive the propeller blade to thereby generate propulsion.

3. The superconducting induction rotating machine of claim 2, wherein the propeller blade is secured on the inner circumferential surface or the outer circumferential surface of the rotor, which is on the side opposite from the side opposing the stator.

4. The superconducting induction rotating machine of claim 1, wherein the rotor is an outer rotor of the rotating machine, and the electrically conductive material layer is provided on an inner diameter side of the rotor, and the magnetic material layer is provided on an outer diameter side of the rotor.

5. The superconducting induction rotating machine of claim 1, wherein the rotor is an inner rotor of the rotating machine, and the electrically conductive material layer is provided on an outer diameter side of the rotor, and the magnetic material layer is provided on an inner diameter side of the rotor.

6. The superconducting induction rotating machine of claim 1, wherein the rotor is provided with radiation fins.

7. The superconducting induction rotating machine of claim 1, wherein the rotor is defined by embedding strip-shaped superconducting wires in the electrically conductive material layer, and securing short-circuit rings on both ends of the rotor in a direction of the central axis line.

8. The superconducting induction rotating machine of claim 7, wherein both ends of the superconducting wires are curved.

9. The superconducting induction rotating machine of claim 7, wherein grooves are formed in the electrically conductive material layer for embedding the superconducting wires in the grooves.

10. The superconducting induction rotating machine of claim 1, wherein the rotor is defined by arranging the superconducting wires on a surface of the electrically conductive material layer in a circumferential direction and a direction intersecting the circumferential direction, respectively, at predetermined intervals.

11. The superconducting induction rotating machine of claim 1, wherein liquid feed propeller blades are secured in an inner diameter section of the rotor, and a fluid flowing through the inner diameter section is pump-driven along an axis line of the rotor.

12. A fluid drive system having the stator and the rotor of the superconducting rotating machine of claim 11, wherein the stator is attached in a mid-section of a fluid flow pipe with a circular cross section with the stator's central axis positioned concentrically with the fluid flow pipe, and the stator is disposed so that it is exposed inside the fluid flow pipe to thereby pump-drive a fluid flowing through the fluid flow pipe.

13. The fluid drive system of claim 12, wherein the pump-driven fluid is a refrigerant, and the superconducting armature coils are cooled with the refrigerant.

14. The fluid drive system of claim 13, wherein the superconducting induction rotating machines are provided at predetermined intervals along the fluid flow pipe.

15. A superconducting driving force generation system, comprising the superconducting induction rotating machine of claim 1, a superconducting electric generator for supplying electricity to the rotating machine, and a superconducting cable for connecting the electric generator and the rotating machine.

16. The superconducting driving force generation system of claim 15, further comprising:

a common freezing system for cooling the superconducting induction rotating machine, the superconducting electric generator and the superconducting cable.

17. The superconducting driving force generation system of claim 15, further comprising:

a gas turbine engine for driving the superconducting electric generator, wherein the gas turbine engine uses a LNG having a refrigerant function or a gas made of a liquid hydrogen treated by a freezing system.

18. A superconducting induction rotating machine, comprising:

a stator having a plurality of superconducting armature coils arranged along circumferential direction of the stator, and a rotor rotatably disposed around a central axis line, and opposing the stator across a predetermined gap, wherein the rotor is configured of a complex comprising a cylindrical electrically conductive material layer disposed on a side opposing the stator and a magnetic material layer disposed on a side opposite from the electrically conductive material layer's side opposing the stator, and wherein the superconducting induction rotating machine rotationally drives the rotor by generating a rotational torque in the rotor with a rotating magnetic field created by the armature coils while the superconducting armature coils disposed on the stator being cooled to a superconducting state;

wherein a tread body for generating propulsion is secured on an inner circumferential surface or an outer circumferential surface of the rotor, and the rotor is rotationally driven to, in turn, drive the tread body to thereby generate propulsion, the tread body is for transmitting a driving force from the rotating machine by friction with an object, wherein the tread body is secured on the inner circumferential surface or the outer circumferential surface of the rotor, which is on the side opposite from the side opposing the stator.

19. An aircraft comprising a superconducting driving force generation system, the superconducting driving force generation system, comprising:

a superconducting induction rotating machine, the superconducting induction rotating machine comprising:

a stator having a plurality of superconducting armature coils arranged along circumferential direction of the stator, and a rotor rotatably disposed around a central axis line, and opposing the stator across a predetermined gap, wherein the rotor is configured of a complex comprising a cylindrical electrically conductive material layer disposed on a side opposing the stator and a magnetic material layer disposed on a side opposite from the electrically conductive material layer's side opposing the stator, and wherein the superconducting induction rotating machine rotationally drives the rotor by generating a rotational torque in the rotor with a rotating magnetic field created by the armature coils while the superconducting armature coils disposed on the stator being cooled to a superconducting state;

a superconducting electric generator for supplying electricity to the rotating machine; and a superconducting cable for connecting the electric generator and the rotating machine;

wherein the superconducting induction rotating machine is installed in parallel on an upper surface of main wings of the aircraft.

* * * * *